US009178975B2

(12) United States Patent
Doyle

(10) Patent No.: US 9,178,975 B2
(45) Date of Patent: Nov. 3, 2015

(54) SYSTEM AND METHOD FOR REDUCING POWER CONSUMPTION OF A WIRELESS TERMINAL AND INCREASING CAPACITY OF A WIRELESS COMMUNICATION SYSTEM

(75) Inventor: Matthew John Doyle, Little Silver, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1980 days.

(21) Appl. No.: 12/102,656

(22) Filed: Apr. 14, 2008

(65) Prior Publication Data
US 2009/0191926 A1 Jul. 30, 2009

Related U.S. Application Data

(63) Continuation of application No. 10/952,803, filed on Sep. 30, 2004, now abandoned.

(51) Int. Cl.
*H04M 1/00* (2006.01)
*H04M 1/725* (2006.01)
*H04M 1/73* (2006.01)
*H04W 52/02* (2009.01)

(52) U.S. Cl.
CPC ............ *H04M 1/72508* (2013.01); *H04M 1/73* (2013.01); *H04W 52/0216* (2013.01); *H04M 1/72583* (2013.01); *Y02B 60/50* (2013.01)

(58) Field of Classification Search
CPC ....... H04W 88/02; H04W 48/12; H04W 4/20; H04M 1/72583
USPC .................................. 455/418–420, 572–574
See application file for complete search history.

(56) References Cited

U.S. PATENT DOCUMENTS

| 4,972,454 | A | * | 11/1990 | Toki et al. ...................... 455/462 |
| 5,285,493 | A |   | 2/1994 | Wagai et al. |
| 5,301,225 | A | * | 4/1994 | Suzuki et al. .................. 455/574 |
| 5,655,218 | A | * | 8/1997 | Smolinske ..................... 455/566 |
| 5,940,771 | A | * | 8/1999 | Gollnick et al. .............. 455/517 |
| 6,275,712 | B1 |   | 8/2001 | Gray et al. |
| 6,317,591 | B1 |   | 11/2001 | Roy |
| 6,324,397 | B1 | * | 11/2001 | Adachi et al. .............. 455/422.1 |
| 6,324,937 | B1 |   | 12/2001 | Chen |

(Continued)

FOREIGN PATENT DOCUMENTS

| CN | 1323495 | 11/2001 |
| EP | 0 892 507 | 1/1999 |

(Continued)

*Primary Examiner* — Charles Appiah
*Assistant Examiner* — Jaime Holliday
(74) *Attorney, Agent, or Firm* — Muncy, Geissler, Olds & Lowe, P.C.

(57) ABSTRACT

A system and a method for reducing the power consumption of a wireless terminal and increasing capacity of a wireless communication system, without sacrificing the functions of the terminal. A base station includes a memory for storing the characteristics of the wireless terminal, the types of voice traffic that are supported by the terminal, and a program for executing an algorithm for exchanging control messages with the terminal via a wireless network. The algorithm is modified based on the particular characteristics of the wireless terminal, and sets the frequency of message exchange to not to exceed a predetermined frequency. In addition, the algorithm limits a time that information is displayed on the wireless terminal to a predetermined duration of time.

4 Claims, 4 Drawing Sheets

(56) References Cited

U.S. PATENT DOCUMENTS

| | | | |
|---|---|---|---|
| 6,397,060 B1* | 5/2002 | Oikawa | 455/420 |
| 6,463,307 B1 | 10/2002 | Larsson et al. | |
| 2001/0046855 A1* | 11/2001 | Kil | 455/421 |
| 2002/0032030 A1* | 3/2002 | Berglund et al. | 455/434 |
| 2003/0128839 A1* | 7/2003 | Shimazaki | 379/433.01 |

FOREIGN PATENT DOCUMENTS

| | | |
|---|---|---|
| JP | 2001-285190 | 10/2001 |
| JP | 2001-292469 | 4/2002 |
| WO | WO 2004/016008 | 2/2004 |

* cited by examiner

SYSTEM AND METHOD FOR REDUCING POWER CONSUMPTION OF A WIRELESS TERMINAL AND INCREASING CAPACITY OF A WIRELESS COMMUNICATION SYSTEM

CROSS REFERENCE TO RELATED APPLICATIONS

This application is a continuation of U.S. application Ser. No. 10/952,803, filed Sep. 30, 2004, entitled "System for Reducing Power Consumption of a Wireless Terminal and Increasing Capacity of a Wireless Communication System," and for which priority is claimed under 35 U.S.C. §120, the entire contents of which are incorporated by reference.

BACKGROUND OF THE INVENTION

1. Field of the Invention

The present invention relates to a system and a method for reducing the power consumption of a wireless terminal and increasing capacity of a wireless communication system without sacrificing functionality.

2. Description of Background Art

When a telephony terminal/endpoint is connected to a source (for example, private branch exchange (PBX), router, private/public network, peer device) via wires or a cable, the source continuously updates the terminal with status and control messages, often at a frequency of several hundred times per second. These messages are used to control visual, audible, and tactile display elements (some examples of these elements might be alphanumeric displays, light emitting diodes (LEDs), ringers, icons).

However, conventional sources often do not have the capability to distinguish between different terminal types, including whether or not the terminal is battery powered, in order to tailor the messages sent based on individual terminal characteristics. When the terminal is wired (e.g.; connected through a dedicated line) and the terminal is powered by the building power rather than a battery, handling of these messages can be done continuously.

However, if the terminal/endpoint is battery powered and is connected by means of a wireless communications network, such continuous updates can unnecessarily prevent the endpoint/terminal from entering "low(er) power mode". In fact, continuously updating by the source of certain messages may provide no benefit at all to the wireless terminal user. For example, if the time-of-day clock of a terminal is capable of only displaying hours and minutes, no benefit results from having the source send time-of-day updates messages at a rate of more than once/minute.

As mentioned above, many sources (switching platform/base stations) are not equipped to determine whether or not that certain terminals have finite power supplies (e.g.; battery powered). If the source of the messages is unaware that the terminal/endpoint has a finite power source, there is no reason why these updates should not be continuous in order to maintain timely and accurate information. However, unnecessary updates not only require greater terminal battery consumption, but the updates also contend for finite bandwidth that exists over the wireless medium/channel, thereby reducing overall capacity for other devices/terminals/endpoints.

There are no known systems or methods to address these problems. In order to minimize the power consumption of a wireless terminal/endpoint, it would be desirable to have a way to limit the exchange of information transmitted from the base station to the wireless phone/terminal/end point. Further it would be desirable to limit the time that display elements are displayed, in order to further limit battery drain and ensure accurate information. In other words, in conventional systems information may get stale over time; in this case displaying no information to the terminal is better than displaying stale or dated information.

SUMMARY AND OBJECTS OF THE INVENTION

The present invention was developed in order to address the problems associated with conventional wireless devices that are described above. The algorithm of the present invention runs under program control in conjunction with the base station or source, by determining that the terminal is battery powered, determining the characteristics of the terminal, and then customizing and limiting the exchange of information transmitted from the base station to the wireless terminal so that the battery life of the terminal can be extended, while still maintaining the features and capabilities offered by the source. The algorithm succeeds in reducing the power consumption of the terminal without sacrificing features and/or capabilities that are provided by a communications protocol that supports display elements. With the present invention, an algorithm running at a base station determines whether an update message should be transmitted to the wireless terminal/endpoint based upon the content of the particular display element of the terminal/endpoint, coupled with the call state of the terminal/endpoint. As shown in FIG. 1, the terminal/endpoint 10 communicates with base station 20, and base station 20 is connected to the source 30, the source being a public network, a private network, or a peer device for example.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
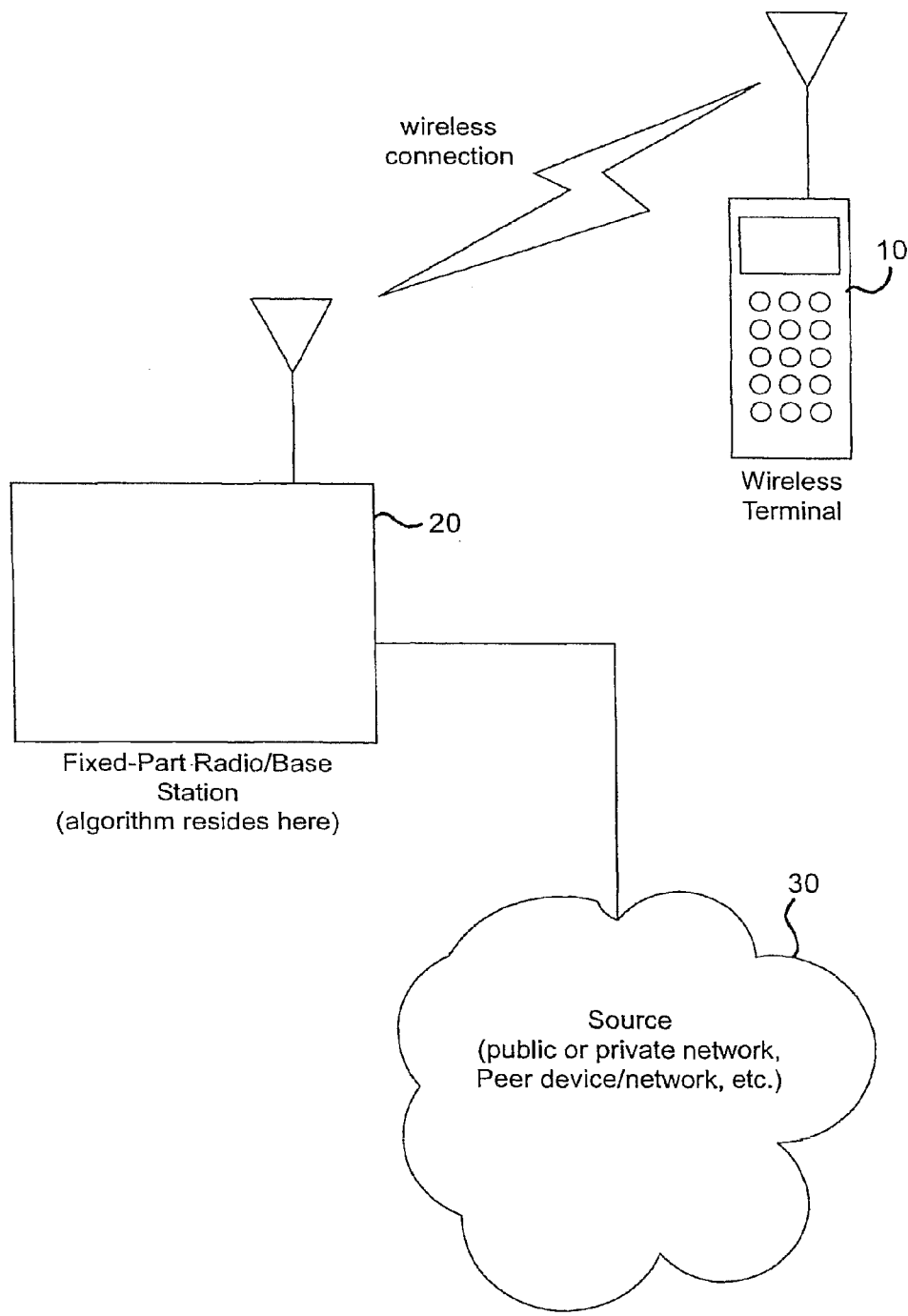
FIG. 1 shows a diagram of a base station connected to a source and communicating with a wireless terminal.

FIG. 1 shows a diagram of a base station 20 communicating with a wireless terminal 10. The base station is connected to a source 30, which may include a public network, a private network, a peer device, etc. As can be seen the algorithm described herein resided in the base station 20. By incorporating the algorithm into the base station 20, the base station can analyze information coming from the source 30. By constantly analyzing the status and control information received from the source 30 coupled with the knowledge of the terminal/endpoint 10 (the fact that it is wireless and it knows its Current state), the base station 20 can decide whether to pass the information on to the terminal/endpoint 10.

Figure 2:
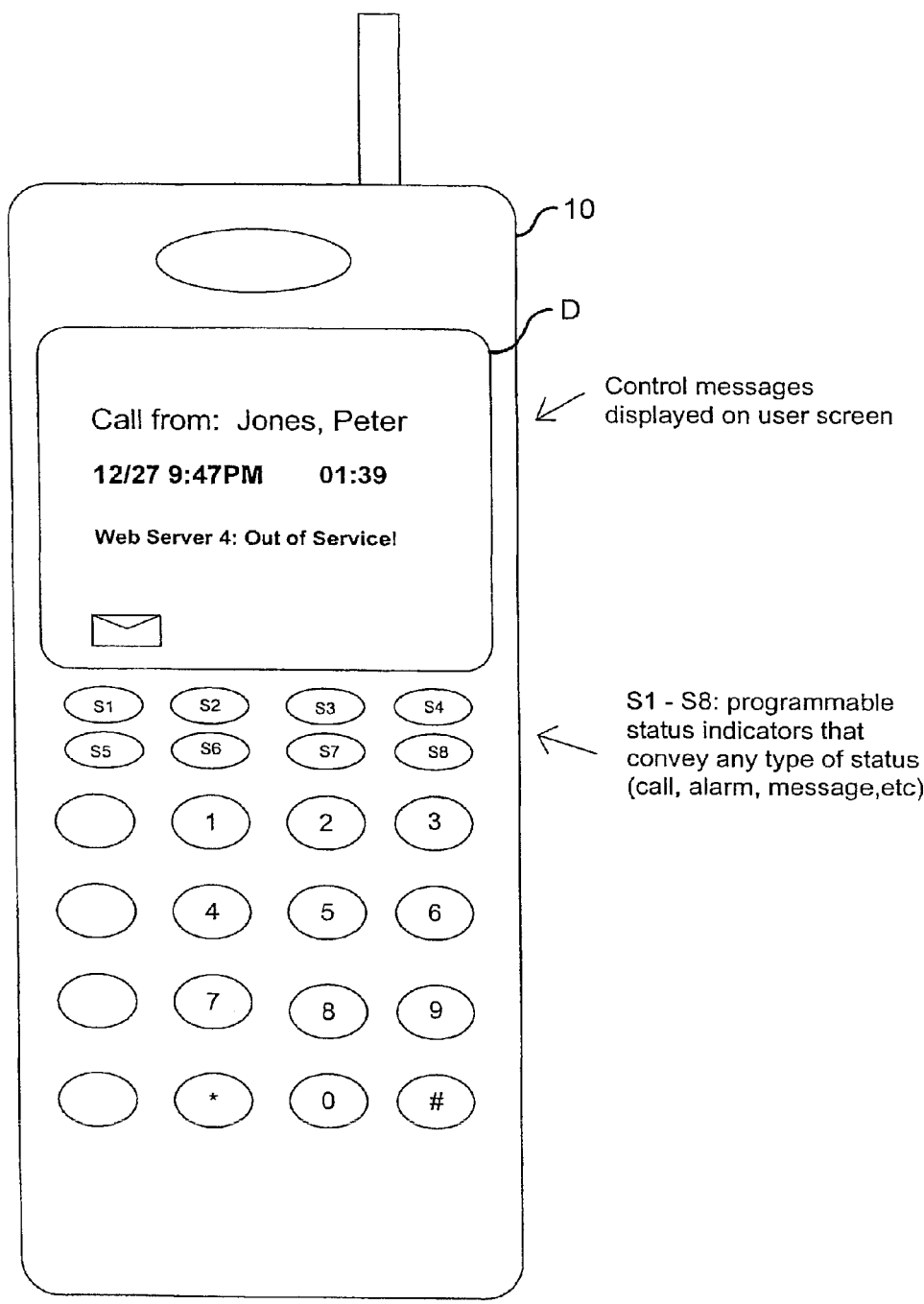
FIG. 2 shows examples of control messages and status indicators displayed on the wireless terminal.

FIG. 2 shows examples of control messages displayed on the wireless terminal. Here the sample terminal/endpoint contains an alphanumeric display screen D, a number of status indicators (visual indicators S1-S8), and display icons on the display screen D for indicating control messages. These display icons may show the information of an incoming call, a text message showing an alarm on a server, and an illuminated icon indicating an unread voice/email resides in the users mailbox, for example.

Protocols used to supports telephony devices such as SIP (Session Initiated Protocol), H.323, ISDN BRI (Basic Rate Interface), and proprietary protocols, transmit/receive control information over signaling "channel" in order to control various display elements (i.e., visual, audible, and tactile). One of the features provided in one embodiment of the invention is the time-of-day clock. This is normally updated every minute on a wired terminal/endpoint. For wireless implementation described the invention, this display of the terminal shows only hours and minutes. In conventional systems prior to this invention, the display update capability of the system caused a continuous radio transmission from the radio base station to the terminal. On the other hand, with the present invention, the algorithm enables the base station to tailor the updates and/or limit the updates that are sent based upon several variables of the system and the terminal, including the call state, and the display timer that describe the state of the call/phone.

Figure 3:
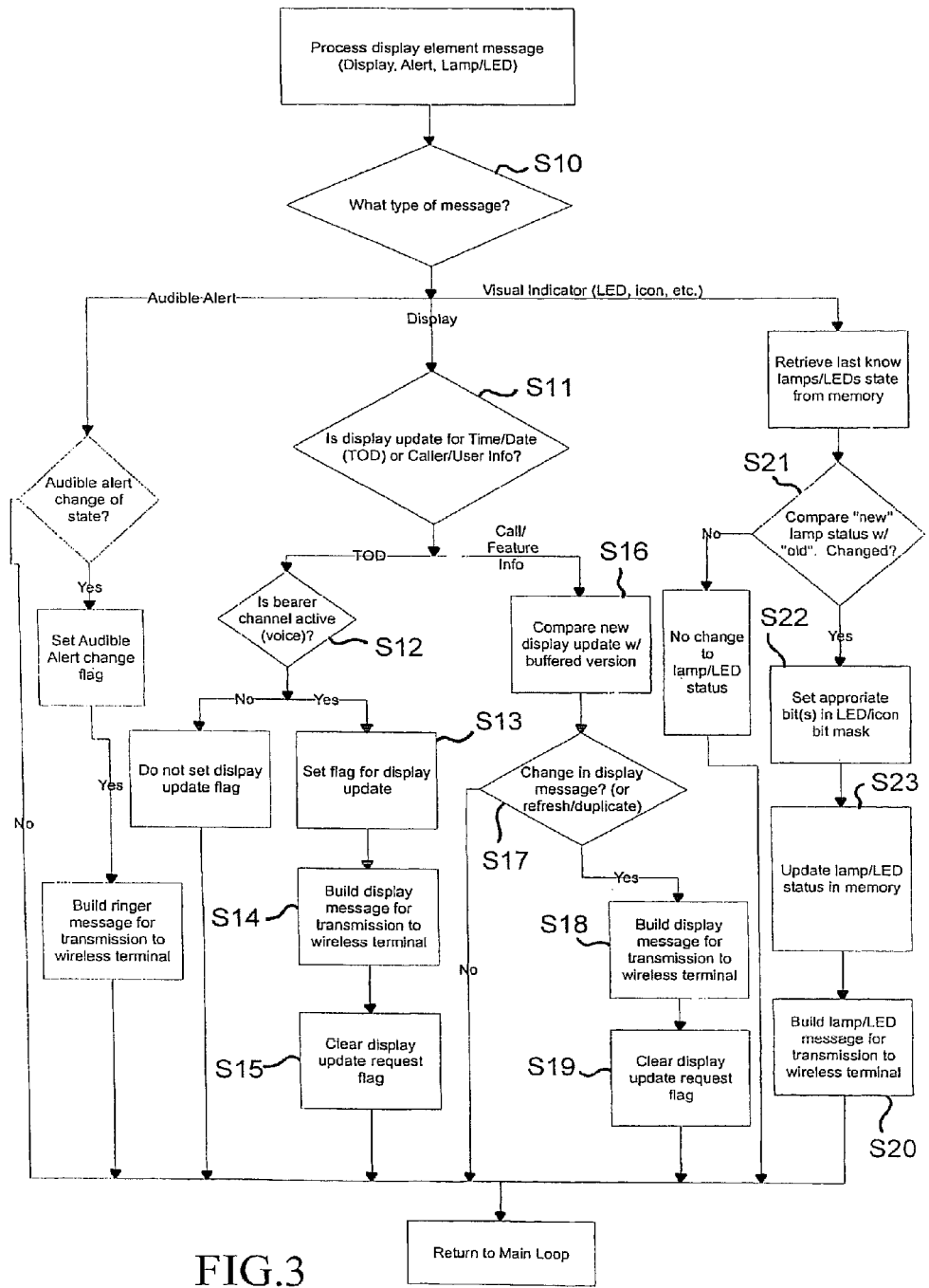
FIG. 3 is a diagram showing the steps executed by the algorithm of the present invention when exchanging status and control messages with a wireless terminal.

The algorithm is detailed in FIG. 3. In particular, FIG. 3 (see Steps S10-S15) shows the steps of analyzing each type of message received from the source. An "image" of the terminal/endpoint is kept in memory to verify any state changes that the source may send either as an update or simply as a "refresh". In addition, the algorithm tracks other variables that describe the state of the terminal in order to see if status or control information should be transmitted to the terminal/endpoint. One such variable is the state of the voice connection. If a voice, or bearer "channel", is currently established to the terminal then some messages that would otherwise be "filtered" are now transmitted due to the terminal, since it known to be already active.

Another feature provided by wireless communications protocols is the ability to illuminate/extinguish visual indicators (LEDs) on the terminal 10. (See FIG. 2) This feature is shown with reference to Steps S20-S23 of FIG. 3. Visual indicators are used to convey status of voice connection, features and/or status indicators offered by the source. The updating and/or refreshing of these indicators is done a continuous basis by the source in order to ensure that the information contained in the terminal is up to date. The algorithm described herein stores the current state of all visual indicators of terminal 10 in the memory of the base station 20. When an update comes from the source 30, the base station 20 passes the information on to the wireless device 10 only if there is a change.

The communications protocol also enables display messages to be sent to terminal 10 in response to certain events such as the making/receiving a call, pressing a button, or conveying status information such as the aforementioned time and data. (See Steps S16-S19 of FIG. 3.) The algorithm only sends these display updates if the terminal/phone 10 is NOT in an idle mode. The idle mode is when there is no (voice) "bearer" channel and the terminal 10 and source 30 have successfully negotiated the "tearing down" of a voice call.

In conjunction with the items mentioned above, the invention also includes the capability of limiting the time that terminal 10 displays certain information. This is done to ensure that updates that are sent remain valid for only a fixed duration of time. A timer of the algorithm is set/reset based upon variables, such as those that are described in the sections above. Prior to the present invention, the display updates provided would remain on the screen until a subsequent update from the source occurred. Since the updates sent to the terminal by the algorithm of the present invention are intentionally less frequent, there needs to be a way to ensure the updates do not get "stale", thereby invalidating the accuracy of the information. The timer solves that issue, as well as contributing to less power usage.

Figure 4:
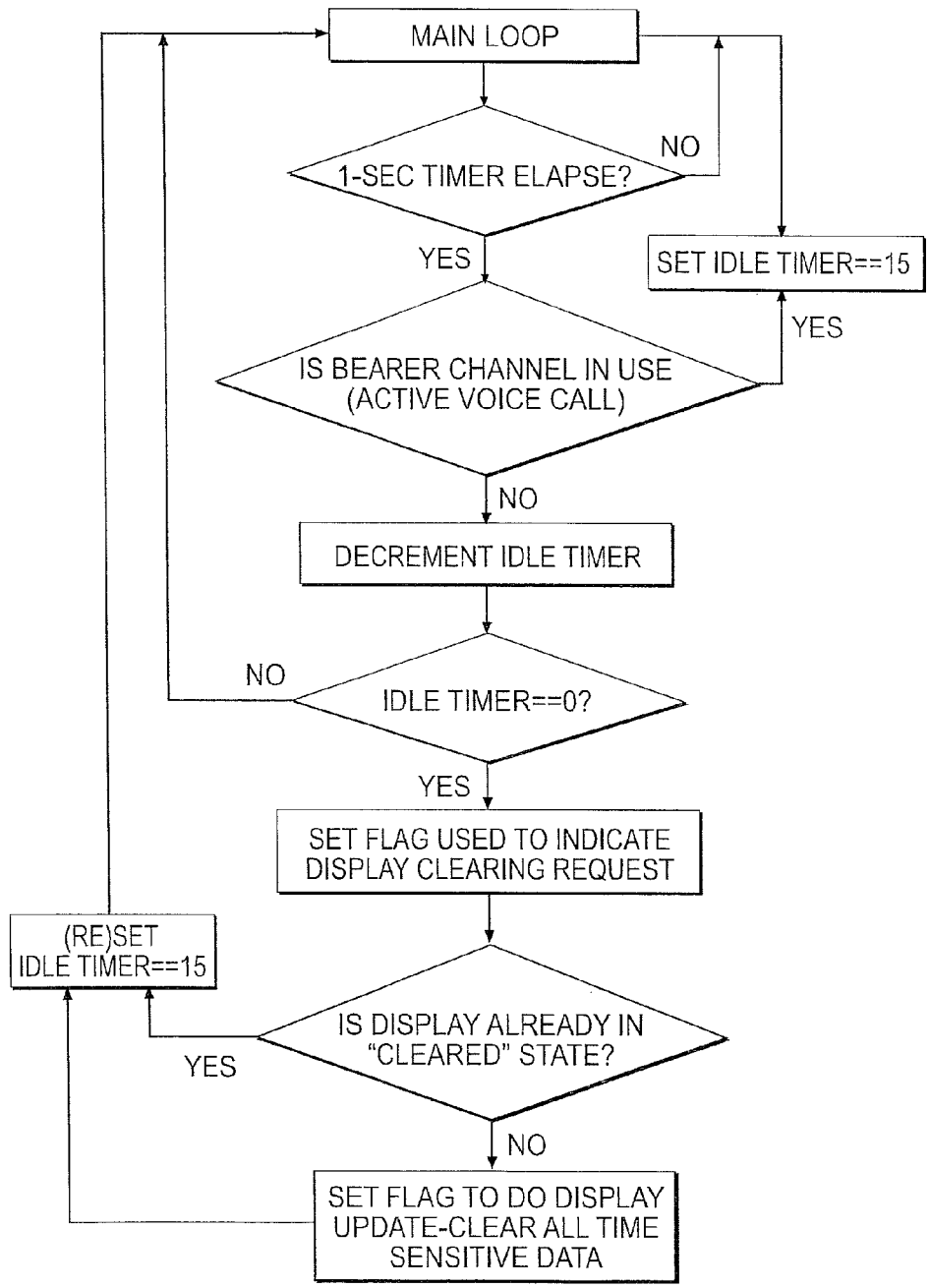
FIG. 4 is a diagram showing the display clearing algorithm of the present invention.

A display clearing algorithm is detailed in FIG. 4. In particular, FIG. 4 shows the steps of clearing the display of time sensitive user data such as a timer of day (TOD) clock or timers that indicate the length of a voice connection.

An advantage of the present invention is that the battery life of a wireless device can be extended while still providing the value-added features that a source affords its wireless phone users.

In addition, the wireless terminal can exploit the value-added features offered by the system, for example, multi-line function, call forwarding, conferencing, call holding, and others, while still maintaining the extended battery life that wireless device user's require. The algorithm of the present invention may be applied to any base station implementation (for example, the source may be a private branch exchange (PBX), router, private/public network, peer device) and telephony protocol (for example, SIP, H.323, ISDN BRI). The algorithm may be implemented in the fixed-part/base station portion of the radio link so it can be added to a system without modifying the software/firmware of the phone/terminal, thus extending the useful life of the source (base station), and deferring or reducing upgrade costs.

The algorithm can be extended to any terminal connected to a switching device, such as a wireless EP endpoint (802.11 for example). The invention can be applied to an 802.11 base station as a way of saving battery life on an 802.11-based endpoint.

INDUSTRIAL APPLICABILITY

According to estimates by Telecompetition, Inc., global phone market is expected to reach 2.2 billion subscribers by 2010, with 75% of these using some form of data. This figure does not include handsets for "private" networks, such as described herein. It is expected that in the future many "public" cellular phones will have provisions to operate on a "private" network, such as described herein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for reducing power consumption of a wireless terminal comprising:
    receiving control messages comprising chronological information at a base station for transmission to a wireless terminal;

determining whether to forward the control messages to the wireless terminal based on the nature of the control messages and an operating state of the wireless terminal; and forwarding the control messages based on the outcome of the determining step, wherein said step of forwarding control messages based on the outcome of the determining step comprises forwarding the chronological information only when a voice channel between the base station and the wireless terminal is active.

2. A method for reducing power consumption of a wireless terminal comprising:

receiving control messages at a base station for transmission to a wireless terminal;

determining whether to forward the control messages to the wireless terminal based on the nature of the control messages and an operating state of the wireless terminal; and forwarding the control messages based on the outcome of the determining step, wherein the control messages comprise status information used by the wireless terminal to affect a status display and including the additional step of maintaining at the base station information indicative of a current status display of the wireless terminal, and wherein said step of forwarding control messages based on the outcome of the determining step comprises forwarding the chronological information only when a voice channel between the base station and the wireless terminal is active.

3. The method of claim 2 wherein said step of forwarding control messages based on the outcome of the determining step comprises forwarding control messages that will change the current status display of the wireless terminal more frequently than control messages that will not change the current status display of the wireless terminal.

4. The method of claim 2 wherein said determining step comprises determining whether the control messages will change the current status display of the wireless terminal.

\* \* \* \* \*